United States Patent

Ono et al.

[11] Patent Number: 5,267,082
[45] Date of Patent: Nov. 30, 1993

[54] ZOOM LENS

[75] Inventors: Shusuke Ono, Takatsuki; Hiroaki Okayama, Hirakata, both of Japan

[73] Assignee: Matsushita Electric Industrial Co., Ltd., Osaka, Japan

[21] Appl. No.: 947,507

[22] Filed: Sep. 17, 1992

[30] Foreign Application Priority Data

Sep. 18, 1991 [JP] Japan .................. 3-237725

[51] Int. Cl.5 .............. G02B 15/14; G02B 13/18; G02B 3/02; H04N 5/225
[52] U.S. Cl. .................. 359/684; 359/687; 359/715; 358/225
[58] Field of Search .............. 358/225; 359/708, 715, 359/774, 676, 684, 686, 687

[56] References Cited

U.S. PATENT DOCUMENTS

| 4,666,257 | 5/1987 | Tanaka et al. | 359/708 X |
| 4,756,608 | 7/1988 | Itoh | 359/687 |
| 4,802,747 | 2/1989 | Horiuchi | 359/687 |
| 4,818,083 | 4/1989 | Mihara | 359/687 |
| 4,859,042 | 8/1989 | Tanaka | 359/684 |
| 5,100,223 | 3/1992 | Ono et al. | 359/683 |

FOREIGN PATENT DOCUMENTS

0012621 1/1991 Japan .................. 359/687

Primary Examiner—Bruce Y. Arnold
Assistant Examiner—David R. Parsons
Attorney, Agent, or Firm—Wenderoth, Lind & Ponack

[57] ABSTRACT

A zoom lens includes sequentially from an object side toward an image surface side a fixed first lens group, a movable second lens group, a fixed third lens group, and a movable fourth lens group. The fixed first lens group is constituted by a first concave lens, a first convexo-convex lens, a second concave lens, a second convexo-convex lens and a meniscus convex lens. The movable second lens group is constituted by a meniscus concave lens, a concavo-concave lens and a convex lens. The fixed third lens group is constituted by a single lens having at least one aspherical surface. The movable fourth lens group is constituted by a concave lens and a convex lens, at least one of which has at least one aspherical surface.

4 Claims, 9 Drawing Sheets

Fig. 13 dd
ZOOM LENS

BACKGROUND OF THE INVENTION

The present invention relates to a high-performance aspherical zoom lens having a wide half angle of view of about 32°–35° at a wide angle end, and a video camera employing the zoom lens.

In response to recent demand for excellent operational efficiency, good mobility and high image quality in video cameras, high-resolution imaging devices as compact as ½" are becoming a mainstream of imaging devices. Meanwhile, in this connection, high-performance and high-magnification zoom lenses which are large in aperture ratio, compact in size and light in weight are in strong demand. Furthermore, due to a big demand for reduction of production costs of zoom lenses, high-performance wide angle zoom lenses in which the number of lens components is reduced are in urgent need.

However, in known wide angle zoom lenses, not only have the diameters of lenses of a first lens group become excessively large, but a large number of lenses are currently required used for performing more strict aberration correction. As a result, the known wide angle zoom lenses have become larger, heavier and more expensive and therefore, have not been suitable for use in video cameras for home use. Therefore, the half angle of view of known compact and light zoom lenses having an F-number of about 1.4 to 1.6 and including lenses about 10 to 13 lenses is 25° or less.

Hereinbelow, one example of a prior art zoom lens for use in a video camera disclosed in, for example, U.S. Pat. No. 5,100,223 is described with reference to FIG. 2. The prior art zoom lens includes a first lens group 21 acting as an image forming portion, a second lens group 22 acting as a magnification changing portion, a third lens group 23 acting as a light converging portion, a fourth lens group 24 acting as a focusing portion and a glass plate 25 optically equivalent to a quartz crystal filter and a face plate of an imaging device. Reference numeral 26 denotes an image surface.

Figure 2:
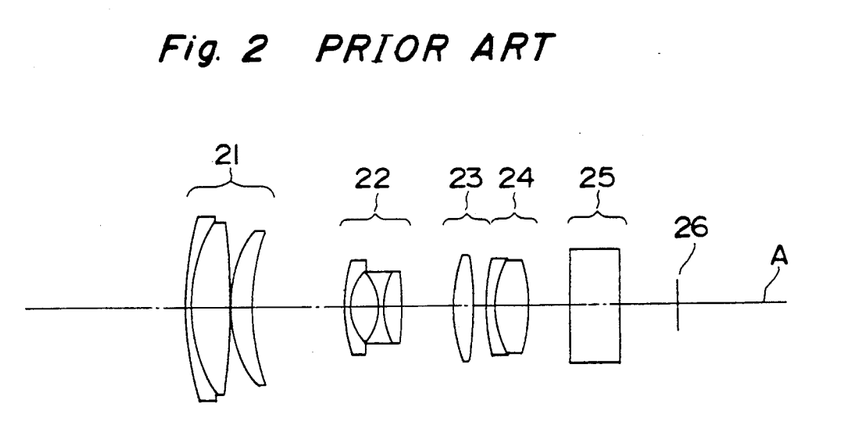
FIG. 2 is a schematic sectional view of a prior art aspherical zoom lens.

Operation of the prior art zoom lens of the above described arrangement is described hereinbelow. The first lens group 21 is fixed relative to the image surface 26 and has an image forming function, while the second lens group 22 is movable along an optical axis A so as to change the magnification such that a focal length of the entire system is changed. The third lens group 23 is fixed relative to the image surface 26 and has a function of converging divergent light produced by the second lens group 22. On the other hand, the fourth lens group 24 is movable along the optical axis A and has a focusing function. Variations in position of the image surface 26 due to travel of the second lens group 22 at the time of zooming are eliminated by displacing the fourth lens group 4 such that the image surface 26 is fixed at a predetermined position.

However, in the prior art zoom lens of the above described arrangement, if it is necessary to raise the half angle of view to 30° or more, it becomes difficult to perform aberration correction especially at a side of wide angle, thereby resulting in a drawback that high image quality cannot be achieved over an entire zoom range.

SUMMARY OF THE INVENTION

Accordingly, an essential object of the present invention is to provide, with a view to eliminating the inconveniences of the prior art, a high-performance wide angle aspherical zoom lens of simple construction having a half angle of view of 30° or more, in which a new lens type and an optical aspherical contour are employed, as well as a video camera employing the wide angle aspherical zoom lens.

It is to be noted that the terms "concave lens" and "convex lens" used hereinbelow are defined according to the Japanese Industrial Standards (JIS). That is, a "concave lens" is a single lens which has a greater thickness at its periphery than along its optical axis, and a "convex lens" is a single lens which has a greater thickness along its optical axis than at its periphery. In addition, in the present application, the term "convexo-convex lens" refers to a single lens which has two opposing convex surfaces, and the term "concavo-concave lens" refers to a single lens which has two opposing concave surfaces.

In order to accomplish the object of the present invention, a wide angle aspherical zoom lens according to the present invention comprises sequentially from a side of an object: a first lens group which has a positive refracting power and is fixed relative to an image surface; a second lens group which has a negative refracting power and is movable along an optical axis of the wide angle aspherical zoom lens so as to have a magnification changing function; a third lens group which has a positive refracting power and is fixed relative to the image surface so as to have a light converging function; and a fourth lens group which has a positive refracting power and is movable along the optical axis such that the image surface displaceable in response to travel of the second lens group and movement of the object is fixed at a position spaced a predetermined distance from a reference surface; wherein a relatively large air space is provided between the third and fourth lens groups; wherein when viewed sequentially from the side of the object, the first lens group is constituted by a first concave lens, a first convexo-convex lens, a second concave lens, a second convexo-convex lens and a meniscus convex lens, the second lens group is constituted by a meniscus concave lens, a concavo-concave lens and a convex lens, the third lens group is constituted by a single lens having at least one aspherical surface and the fourth lens group is constituted by a concave lens and a convex lens at least one of which has at least one aspherical surface.

The lenses of the first to fourth lens groups have surface contours preferable for excellent aberration performance. To this end, it is preferable in the first lens group that the first concave lens has a concave surface confronting the image surface, the second concave lens is a meniscus concave lens having a concave surface confronting the image surface and the meniscus convex lens having a concave surface confronting the image surface and that a relatively large air space is provided between the first concave lens and the first convexo-convex lens.

More specifically, the wide angle aspherical zoom lens of the present invention should desirably satisfy the following conditions (1) to (3):

$$1.0 < r2/f1 < 3.0 \tag{1}$$

$$1.5 < r3/f1 < 3.5 \quad (2)$$

$$0.2 < d2/f1 < 0.8 \quad (3)$$

where character f1 denotes a focal length of the first lens group, character r2 denotes a radius of curvature of one surface of the first concave lens of the first lens group, which surface confronts the image surface, character r3 denotes a radius of curvature of one surface of the first convexo-convex lens of the first lens group, which surface confronts the object and character d2 denotes an air space between the first concave lens and the first convexo-convex lens in the first lens group.

Meanwhile, in order to accomplish the object of the present invention, a video camera according to the present invention includes at least the wide angle aspherical zoom lens of the present invention, an imaging device, a signal processing circuit and a viewfinder.

By the above described arrangement of the present invention, the problems inherent in the prior art can be solved. Namely, when viewed sequentially from the side of the object, the first lens group is constituted by the first concave lens, the first convexo-convex lens, the second concave lens, the second convexo-convex lens and the meniscus convex lens, the second lens group is constituted by the meniscus concave lens, the concavo-concave lens and the convex lens, the third lens group is constituted by the single lens having at least one aspherical surface and the fourth lens group is constituted by the concave lens and the convex lens at least one of which has at least one aspherical surface. As a result, the high-performance wide angle aspherical zoom lens having a half angle of view of about 32° or more can be obtained with a simple construction.

Meanwhile, when the above conditions (1) to (3) are satisfied, the high-performance wide angle aspherical zoom lens of simple construction in which aberrations are corrected excellently can be obtained.

In addition, by using the wide angle aspherical zoom lens of the present invention, a compact and light video camera having high image quality and a wide shooting range can be obtained.

In accordance with the present invention as is clear from the foregoing, the wide angle aspherical zoom lens having a half angle of view of 32°–35°, an F-number of about 1.4 and a zoom ratio of about 8 can be obtained by as few as 11 lens components, and the compact, light and high-performance video camera having a wide shooting range can be obtained by using this wide angle aspherical zoom lens.

BRIEF DESCRIPTION OF THE DRAWINGS

This object and features of the present invention will become apparent from the following description taken in conjunction with the preferred embodiments thereof with reference to the accompanying drawings, in which.

In the diagrams of spherical aberration, the solid line, the dotted line and the broken line illustrate a d-line, an F-line and a C-line, respectively, while in the diagrams of astigmatism, the solid line and the dotted line illustrate a sagittal image surface and meridional image surface, respectively.

Before the description of the present invention proceeds, it is to be noted that like parts are designated by like reference numerals throughout several views of the accompanying drawings.

DETAILED DESCRIPTION OF THE INVENTION

Figure 1:
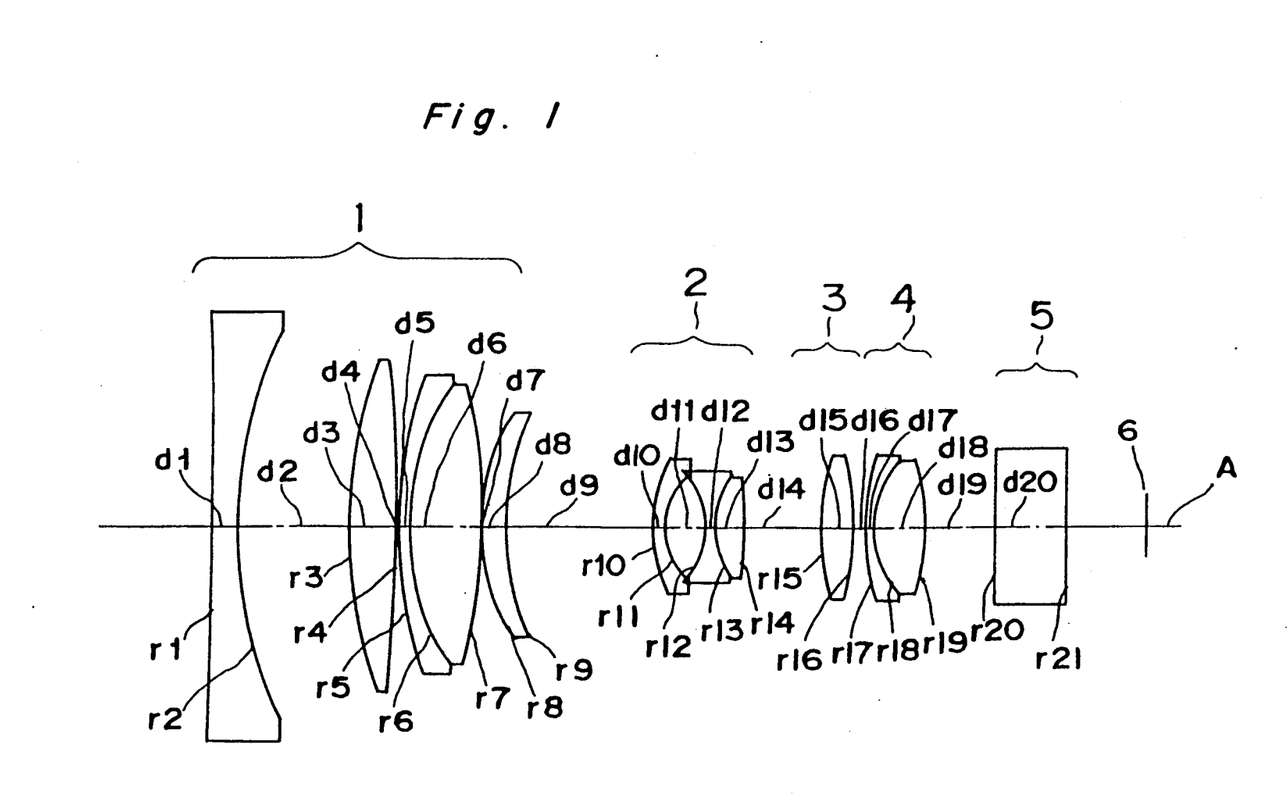
FIG. 1 is a schematic sectional view of an aspherical zoom lens according to a first embodiment of the present invention.

Referring now to the drawings, there is shown in FIG. 1, a wide angle aspherical zoom lens according to a first embodiment of the present invention. The wide angle aspherical zoom lens includes a first lens group having a positive refracting power, a second lens group 2 having a negative refracting power, a third lens group 3 constituted by an aspherical lens having a positive refracting power, a fourth lens group 4 having a positive refracting power and a flat glass plate 5 optically equivalent to a quartz crystal filter and a face plate of an imaging device. Reference numeral 6 denotes an image surface.

The first lens group 1 has an image forming function and is fixed relative to the image surface 6. The second lens group 2 is movable along an optical axis A so as to have a magnification changing function. The third lens group 3 has a light converging function and is fixed relative to the image surface 6. The fourth lens group 4 is movable along the optical axis so as to make focusing adjustments and includes an aspherical lens.

A relatively large air space d16 is provided between the third and fourth lens groups 3 and 4. When viewed sequentially from the object side toward the image surface side, the first lens group 1 includes a first concave lens, a first convexo-convex lens, a cemented lens composed of a second concave lens and a second double convex lens and a meniscus convex lens, while the second lens group 2 includes a meniscus concave lens and a cemented lens composed of a concavo-concave lens and a convex lens. On the other hand, the third lens group 3 is constituted by a single lens having at least one aspherical surface. Meanwhile, the fourth lens group 4 includes a concave lens and a convex lens, at least one of which has at least one aspherical surface.

The requirements that in the first lens group 1, the first concave lens has a concave surface confronting the image surface 6, the second concave lens is a meniscus concave lens having a concave surface confronting the image surface 6 and the meniscus convex lens has a concave surface confronting the image surface 6 and that the relatively large air space d16 is provided between the third and fourth lens groups 3 and 4 are essential for correcting various aberrations of a half angle of view of about 32° or more by using a small number of the lens components.

It is preferable for the wide angle aspherical zoom lens to satisfy the following conditions (1) to (3):

$$1.0 < r2/f1 < 3.0 \quad (1)$$

$$1.5 < r3/f1 < 3.5 \quad (2)$$

$$0.2 < d2/f1 < 0.8 \quad (3)$$

where character f1 denotes a focal length of the first lens group 1, character r2 denotes a radius of curvature of one surface of the first concave lens of the first lens group 1, which surface confronts the image surface 6, character r3 denotes a radius of curvature of one surface of the first convexo-convex lens of the first lens group 1, which surface confronts the object, and character d2 denotes an air space between the first concave lens and the first convexo-convex lens in the first lens group 1.

The conditions (1) to (3) are described in more detail, hereinbelow. The condition (1) relates to the radius r2 of curvature of the surface of the first concave lens of the first lens group 1, which surface confronts the image surface 6. The condition (2) relates to the radius of curvature of the surface of the first convexo-convex lens of the first lens group 1, which surface confronts the object. When the ratio (r2/f1) of the condition (1) falls below the lower limit of 1.0 or the ratio (r3/f1) of the condition (2) falls below the lower limit of 1.5, astigmatism in meridional direction in the vicinity of a relative angle of view of 0.7 becomes large, and thus, excellent image forming performance cannot be obtained. On the other hand, when the ratio of the condition (1) exceeds the upper limit of 3.0 or the ratio of the condition (2) exceeds the upper limit of 3.5, distortion at a wide angle end assumes a large negative value and thus, cannot be corrected.

The condition (3) relates to the air space d2 between the first concave lens and the first convexo-convex lens in the first lens group 1. When the ratio (d2/f1) of the condition (3) falls below the lower limit of 0.2, refracting power of the first concave lens and the first convexo-convex lens of the first lens group 1 becomes excessively large, so that astigmatism and distortion in the vicinity of the wide angle end cannot be corrected in a well-balanced manner. On the contrary, when the ratio of the condition (3) exceeds the upper limit of 0.8, it is difficult to make the entire system compact and it is impossible to reduce the diameter of the first concave lens of the first lens group 1. As a result, the entire system cannot be made compact or light.

In the wide angle aspherical zoom lens according to the first embodiment of the present invention, one concrete example satisfying the conditions (1) to (3) is shown in Table 1 below.

TABLE 1

$f = 5.200\text{--}40.062$
$F/No. = 1.47\text{--}2.29$

| Lens group | i of i-th surface | r | d | n | v |
|---|---|---|---|---|---|
| 1 | 1 | −438.717 | 2.00 | 1.60311 | 60.7 |
|   | 2 | 40.135 | 9.80 |  |  |
|   | 3 | 49.581 | 4.30 | 1.51633 | 64.1 |
|   | 4 | −139.707 | 0.20 |  |  |
|   | 5 | 41.629 | 0.90 | 1.80518 | 25.4 |
|   | 6 | 21.035 | 5.85 | 1.58913 | 61.2 |
|   | 7 | −92.085 | 0.15 |  |  |
|   | 8 | 16.090 | 2.55 | 1.60311 | 60.7 |
|   | 9 | 28.707 | Variable |  |  |
| 2 | 10 | 17.510 | 0.70 | 1.69680 | 55.6 |
|   | 11 | 5.792 | 3.47 |  |  |
|   | 12 | −7.798 | 0.70 | 1.67003 | 47.2 |
|   | 13 | 7.798 | 2.65 | 1.80518 | 25.5 |
|   | 14 | −340.780 | Variable |  |  |
| 3 | 15 | 14.582 | 2.92 | 1.60602 | 57.4 |
|   | 16 | −41.160 | Variable |  |  |
| 4 | 17 | 29.411 | 0.70 | 1.84666 | 23.9 |
|   | 18 | 9.200 | 4.37 | 1.66547 | 55.2 |
|   | 19 | −17.766 | Variable |  |  |
| 5 | 20 | ∞ | 6.30 | 1.51633 | 64.1 |
|   | 21 | ∞ | — |  |  |

In Table 1, character r denotes the radius of curvature of a surface of each of the lenses of the zoom lens, character d denotes the thickness of each of the lenses of the zoom lens or air space between the lenses, character n denotes the refractive index for the d-line of each of the lenses of the zoom lens, character v denotes an Abbe number for the d-line of each of the lenses of the zoom lens, character f denotes the focal length at the wide angle end and a telephoto end of the zoom lens, and character F/No. denotes the F-number at the wide angle end and the telephoto end of the zoom lens.

Meanwhile, the contour of the aspherical surface is defined by the following equation:

$$Z = C \cdot Y^2 / \{1 + \sqrt{1 - (1 + K) \cdot C^2 \cdot Y^2}\} +$$
$$D \cdot Y^4 + E \cdot Y^6 + F \cdot Y^8 + G \cdot Y^{10} + H \cdot Y^{12} + I \cdot Y^{14}$$

where Z denotes a distance between a vertex of the aspherical surface and a point on the aspherical surface when the height of the point from the optical axis A is expressed by Y, character C denotes a curvature of the vertex of the aspherical surface, character K denotes a conical constant and characters D to I denote aspherical coefficients.

In Table 1, the 15th, 16th and 19th surfaces are aspherical, and the conical constant K and the aspherical coefficients D to I of these surfaces are shown in Table 2 below.

TABLE 2

|  | 15th surface | 16th surface | 19th surface |
|---|---|---|---|
| K | −2.62041E − 1 | −6.55280E + 1 | −9.74558E − 2 |

TABLE 2-continued

|   | 15th surface | 16th surface | 19th surface |
|---|---|---|---|
| D | 1.20363E − 5 | 3.50783E − 5 | 1.89064E − 5 |
| E | −3.02701E − 6 | −2.39152E − 6 | 3.52251E − 6 |
| F | 3.43684E − 9 | −1.00707E − 8 | −1.27121E − 7 |
| G | −4.80097E − 10 | −1.60456E − 10 | 2.17729E − 9 |
| H | 3.91467E − 12 | 2.68262E − 12 | −8.10168E − 12 |
| I | 1.16381E − 13 | 8.36613E − 14 | −2.28223E − 13 |

Then, as examples of the air space which can be varied by zooming, values of the air space obtained when an object point is disposed at an infinite distance from the zoom lens, values of the air space obtained when the object point is disposed at a distance of 1.4 m from the surface r1 of the first lens group 1, and values of the air space obtained when the object point is disposed at a distance of 0.7 m from the surface r1 of the first lens group 1 are, respectively, shown in Tables 3, 4 and 5 below. In Tables 3 to 5, the indication "Standard" means a standard position representing a zoom position where the fourth lens group 4 comes closest to the third lens group 3 for each position of the object point.

TABLE 3

|   | Wide angle | Standard | Telephoto |
|---|---|---|---|
| f | 6.110 | 24.311 | 47.991 |
| d9 | 1.000 | 12.300 | 16.312 |
| d14 | 17.824 | 6.524 | 2.512 |
| d16 | 5.122 | 1.579 | 5.122 |
| d19 | 2.000 | 5.534 | 2.000 |

TABLE 4

|   | Wide angle | Standard | Telephoto |
|---|---|---|---|
| f | 6.108 | 25.838 | 47.013 |
| d9 | 1.000 | 12.700 | 16.312 |
| d14 | 17.824 | 6.124 | 2.512 |
| d16 | 5.102 | 1.258 | 3.922 |
| d19 | 2.020 | 5.864 | 3.200 |

TABLE 5

|   | Wide angle | Standard | Telephoto |
|---|---|---|---|
| f | 6.105 | 28.043 | 46.170 |
| d9 | 1.000 | 13.230 | 16.312 |
| d14 | 17.824 | 5.594 | 2.512 |
| d16 | 5.083 | 0.907 | 2.846 |
| d19 | 2.039 | 6.215 | 4.276 |

Figure 3:
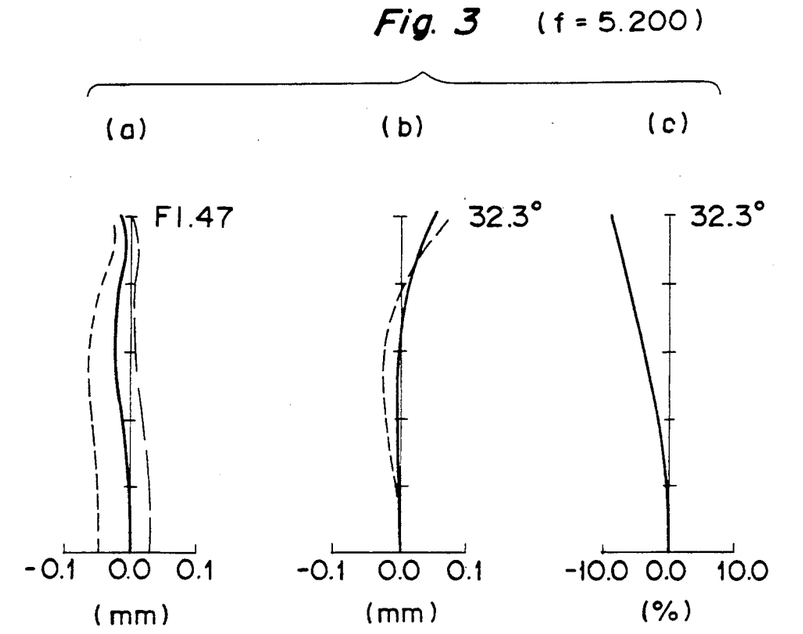
FIGS. 3(a), 3(b) and 3(c) are diagrams showing spherical aberration, astigmatism and distortion, respectively, at a wide angle end in the aspherical zoom lens of FIG. 1.
Figure 4:
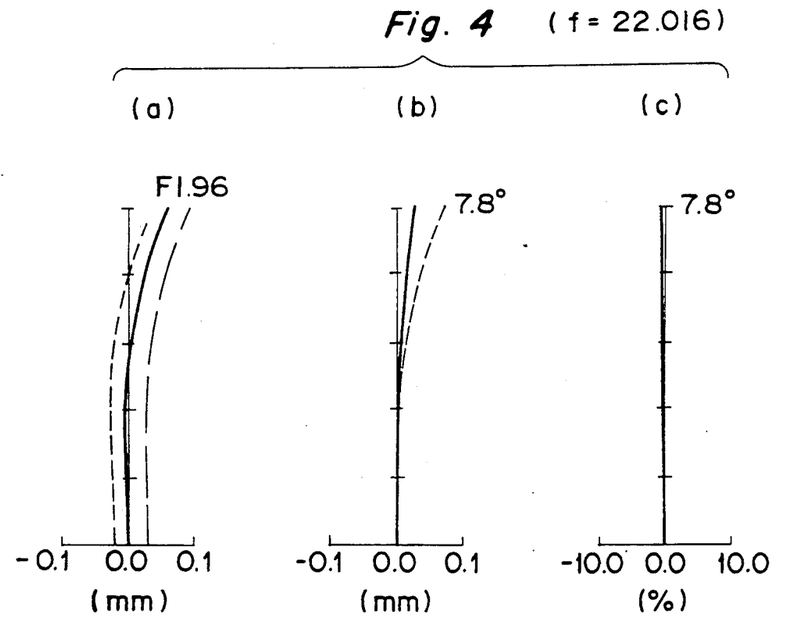
FIGS. 4(a), 4(b) and 4(c) are diagrams showing spherical aberration, astigmatism and distortion, respectively, at a standard position in the aspherical zoom lens of FIG. 1.
Figure 5:
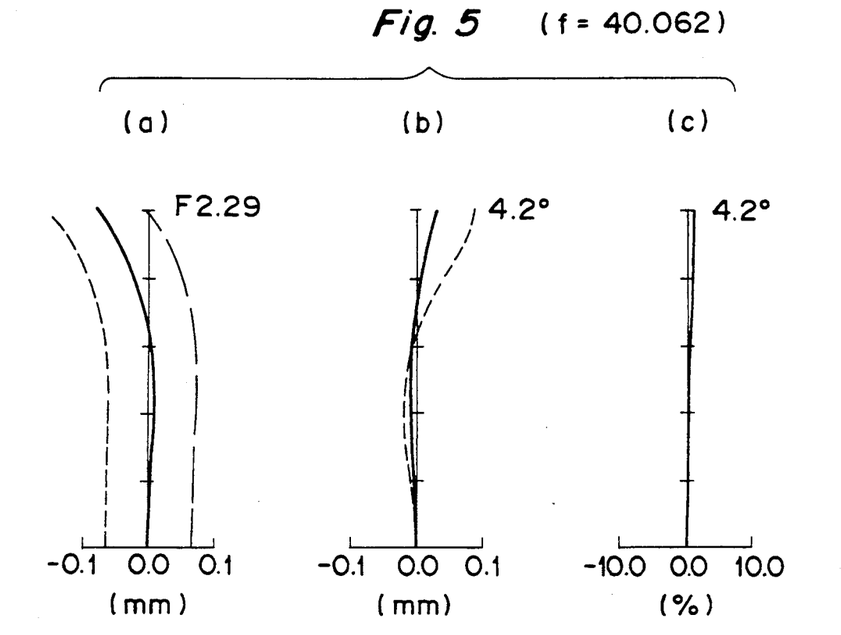
FIGS. 5(a), 5(b) and 5(c) are spherical aberration, astigmatism and distortion, respectively, at a telephoto end in the aspherical zoom lens of FIG. 1.

FIGS. 3, 4 and 5 show aberrations at the wide angle end, the standard position and the telephoto end of the wide angle aspherical zoom lens shown in Table 1, respectively, and exhibit excellent optical performance of the zoom lens of Table 1.

In this embodiment, the convex lens of the fourth lens group 4 has the aspherical surface r19. However, it is needless to say that the present invention is also applicable to a case in which the concave lens of the fourth lens group 4 has at least one aspherical surface.

Values of a wide angle aspherical zoom lens according to a second embodiment of the present invention are shown in Table 6 below. Since the lens arrangement of this zoom lens is similar to that of FIG. 1 of the zoom lens according to the first embodiment of the present invention, description thereof is abbreviated for the sake of brevity.

In Table 6, the 5th–11th lenses (counted from the object side toward the image surface side), and intervals between neighboring ones of these lenses, are the same as those shown in Table 1.

TABLE 6

| Lens group | i of i-th surface | f = 5.200–40.047 F/No. = 1.47–2.29 | | | |
|---|---|---|---|---|---|
|   |   | r | d | n | ν |
| 1 | 1 | −159.394 | 2.00 | 1.60311 | 60.7 |
|   | 2 | 52.509 | 10.20 |   |   |
|   | 3 | 64.491 | 4.00 | 1.51633 | 64.1 |
|   | 4 | −113.286 | 0.20 |   |   |
|   | 5 | 40.103 | 1.00 | 1.80518 | 25.4 |
|   | 6 | 20.643 | 6.00 | 1.58913 | 61.2 |
|   | 7 | −92.085 | 0.15 |   |   |
| (The remaining portion is the same as Table 1) | | | | | |

Figure 6:
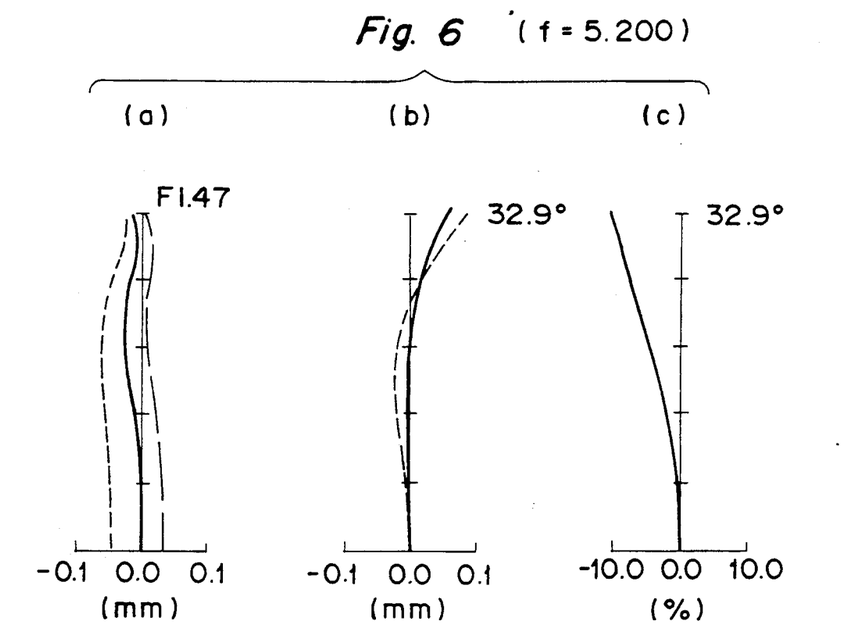
FIGS. 6(a), 6(b) and 6(c) are diagrams showing spherical aberration, astigmatism and distortion at a wide angle end in an aspherical zoom lens according to a second embodiment of the present invention.
Figure 7:
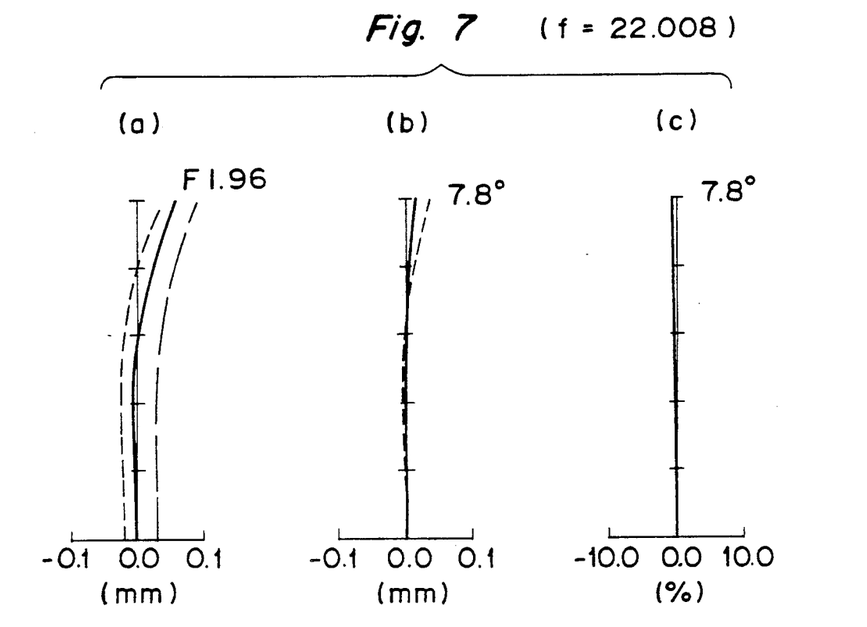
FIGS. 7(a), 7(b) and 7(c) are diagrams showing spherical aberration, astigmatism and distortion, respectively, at a standard position in the aspherical zoom lens of FIG. 6, respectively.
Figure 8:
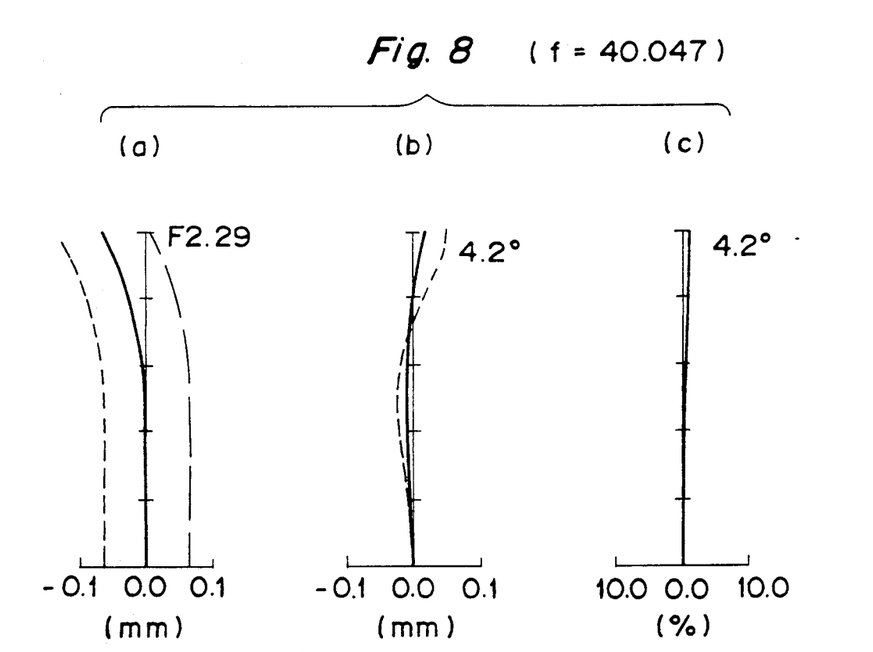
FIGS. 8(a), 8(b) and 8(c) are diagrams showing spherical aberration, astigmatism and distortion, respectively, at a telephoto end in the aspherical zoom lens of FIG. 6.

FIGS. 6, 7 and 8 show aberrations at the wide angle end, the standard position and the telephoto end of the wide angle aspherical zoom lens shown in Table 6 and exhibit excellent optical performance of the zoom lens of Table 6.

Figure 9:
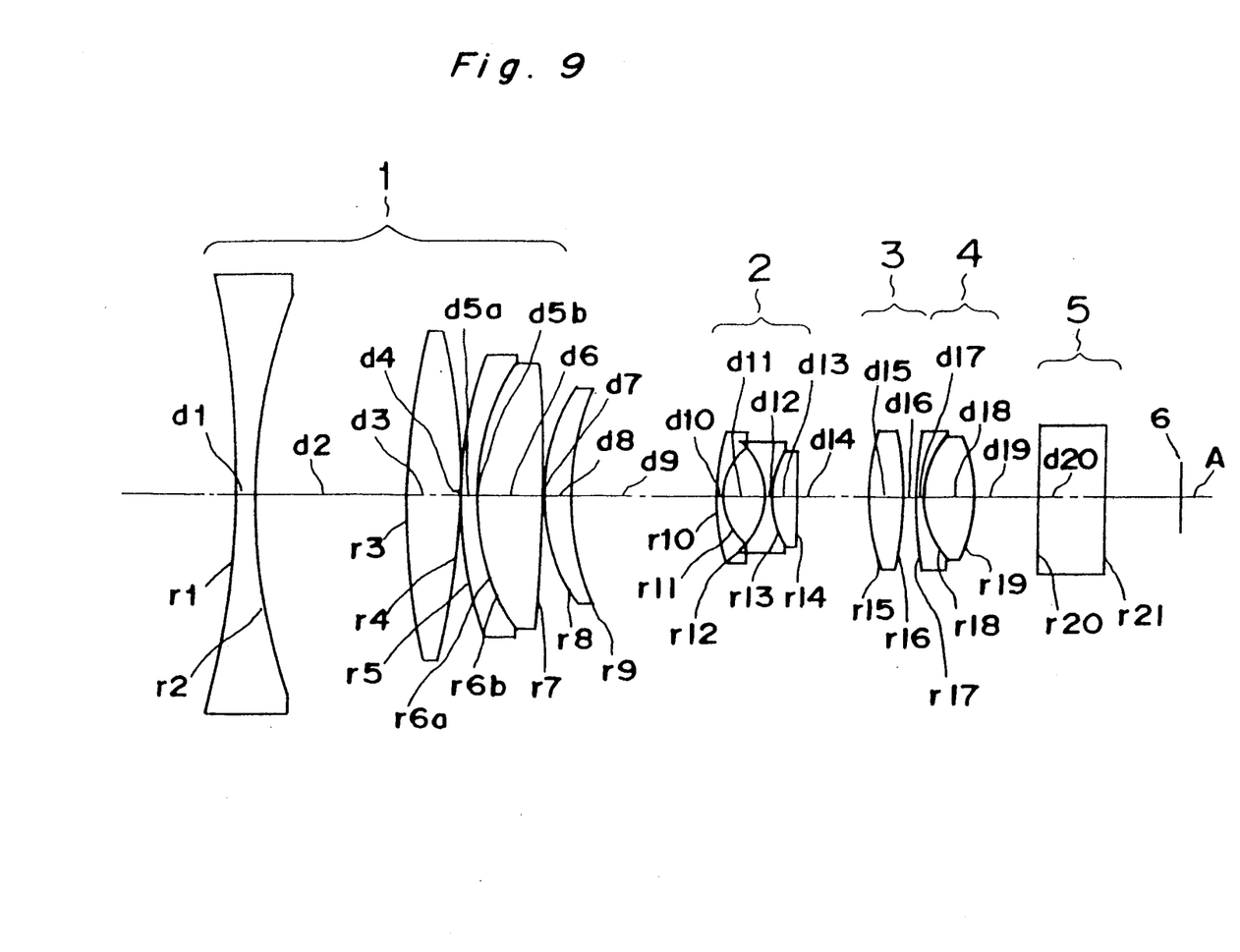
FIG. 9 is a schematic sectional view of an aspherical zoom lens according to a third embodiment of the present invention.

Referring to FIG. 9, there is shown a wide angle aspherical zoom lens according to a third embodiment of the present invention.

TABLE 7

| Lens group | i of i-th surface | f = 5.000–38.521 F/No. = 1.47–2.29 | | | |
|---|---|---|---|---|---|
|   |   | r | d | n | ν |
| 1 | 1 | −96.865 | 2.00 | 1.60311 | 60.7 |
|   | 2 | 61.868 | 13.42 |   |   |
|   | 3 | 67.112 | 5.00 | 1.51633 | 64.1 |
|   | 4 | −67.112 | 0.20 |   |   |
|   | 5 | 40.950 | 1.20 | 1.80518 | 25.4 |
|   | 6a | 21.095 | 0.04 |   |   |
|   | 6b | 21.241 | 6.20 | 1.58913 | 61.2 |
|   | 7 | −169.025 | 0.20 |   |   |
| (The remaining portion is the same as Table 1) | | | | | |

Values of the zoom lens of FIG. 9 are shown in Table 7 above. In Table 7, the 5th–11th lenses (counted from the object side toward the image surface side), and intervals between neighboring ones of these lenses, are the same as those shown in Table 1.

The zoom lens of FIG. 9 is structurally different from that of FIG. 1 in that the second concave lens and the second convexo-convex lens of the first lens group 1 are formed into the cemented lens in FIG. 1, while the second concave lens and the second convexo-convex lens of the first lens group 1 are provided separately from each other in FIG. 9.

Figure 10:
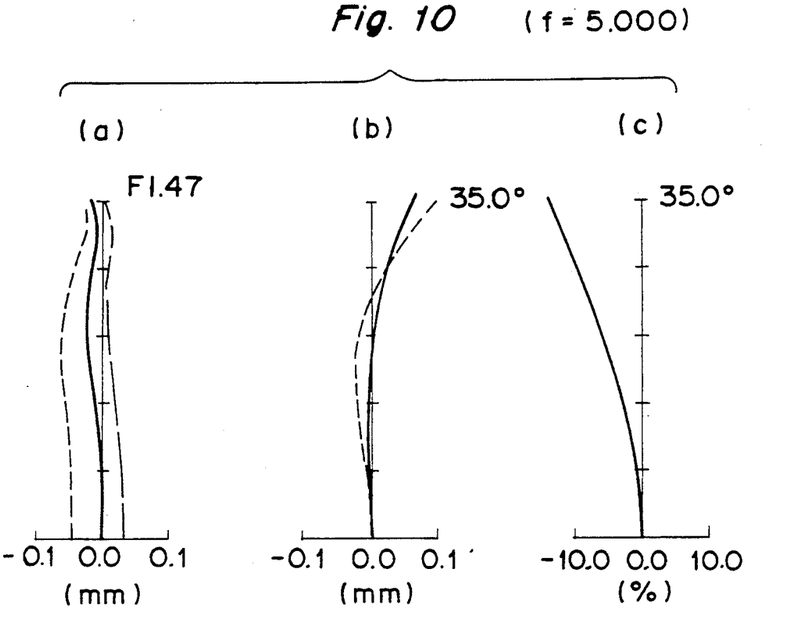
FIGS. 10(a), 10(b) and 10(c) are diagrams showing spherical aberration, astigmatism and distortion, respectively, at a wide angle end in the aspherical zoom lens of FIG. 9.
Figure 11:
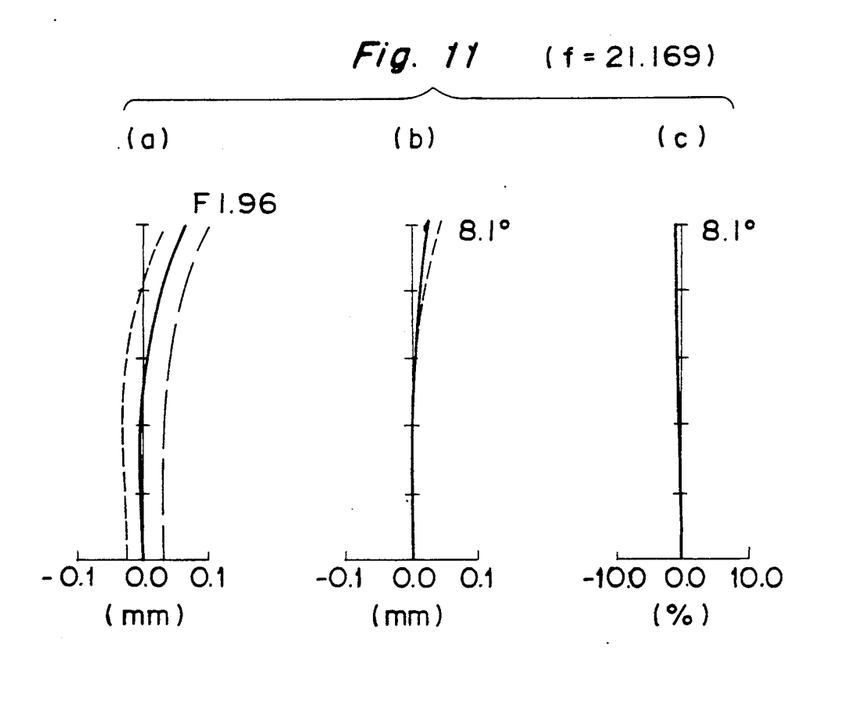
FIGS. 11(a), 11(b) and 11(c) are diagrams showing spherical aberration, astigmatism and distortion, respectively, at a standard position in the aspherical zoom lens of FIG. 9.
Figure 12:
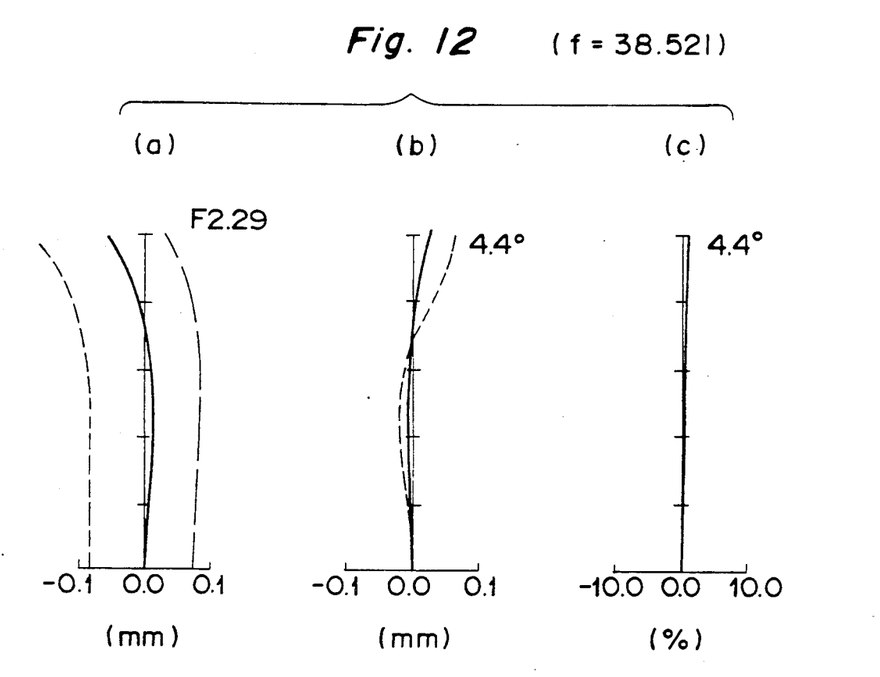
FIGS. 12(a), 12(b) and 12(c) are diagrams showing spherical aberration, astigmatism and distortion, respectively, at a telephoto end in the aspherical zoom lens of FIG. 9, respectively.

Meanwhile, FIGS. 10, 11 and 12 show aberrations at the wide angle end, the standard position and the telephoto end of the wide angle aspherical zoom lens shown in Table 7, respectively, and exhibit excellent optical performance of the zoom lens of Table 7.

Figure 13:
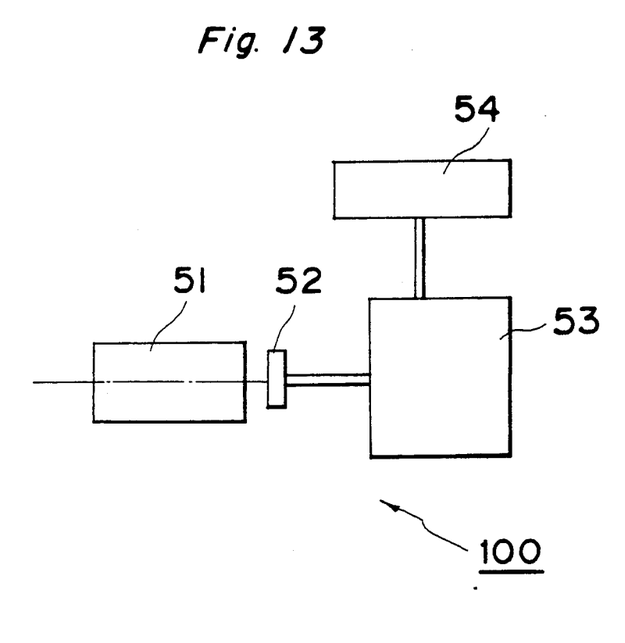
FIG. 13 is a block diagram showing a video camera according to the present invention, which includes the aspherical zoom lens of the present invention.

FIG. 13 shows a video camera 100 according to the present invention. The video camera 100 includes at least a wide angle aspherical zoom lens 51 of the present invention, an imaging device 52, a signal processing circuit 53 and a viewfinder 54.

What is claimed is:

1. A wide angle aspherical zoom lens comprising sequentially from an object side toward an image surface side:

a first lens group which has a positive refracting power and is fixed relative to an image surface;

a second lens group which has a negative refracting power and is movable along an optical axis of said wide angle aspherical zoom lens so as to have a magnification changing function;

a third lens group which has a positive refracting power and is fixed relative to the image surface so as to have a light converging function; and a fourth lens group which has a positive refracting power and is movable along the optical axis such that the image surface displaceable in response to travel of said second lens group and movement of the object is fixed at a position spaced a predetermined distance from a reference surface;

wherein an air space is provided between said third and fourth lens groups;

wherein, when viewed sequentially from the object side toward the image surface side, said first lens group is constituted by a first concave lens, a first convexo-convex lens, a second concave lens, a second convexo-convex lens and a meniscus convex lens, said second lens group is constituted by a meniscus concave lens, a concavo-concave lens and a convex lens, said third lens group is constituted by a single lens having at least one aspherical surface, and said fourth lens group is constituted by a concave lens and a convex lens, at least one of which has at least one aspherical surface.

2. A wide angle aspherical zoom lens as claimed in claim 1, wherein in said first lens group, said first concave lens has a concave surface confronting the image surface, said second concave lens is a meniscus concave lens having a concave surface confronting the image surface, said meniscus convex lens has a concave surface confronting the image surface and an air space is provided between said first concave lens and said first convexo-convex lens.

3. A wide angle aspherical zoom lens as claimed in claim 2, wherein the following conditions (1) to (3) are satisfied:

$$1.0 < r2/f1 < 3.0 \quad (1)$$

$$1.5 < r3/f1 < 3.5 \quad (2)$$

$$0.2 < d2/f1 < 0.8 \quad (3)$$

where character f1 denotes a focal length of said first lens group, character r2 denotes a radius of curvature of one surface of said first concave lens of said first lens group, which surface confronts the image surface, character r3 denotes a radius of curvature of one surface of said first convexo-convex lens of said first lens group, which surface confronts the objects, and character d2 denotes the air space between said first concave lens and said first convexo-convex lens in said first lens group.

4. A video camera including a wide angle aspherical zoom lens, an imaging device, a signal processing circuit and a viewfinder, said wide angle aspherical zoom lens comprising sequentially from an object side toward an image surface side:

a first lens group which has a positive refracting power and is fixed relative to an image surface;

a second lens group which has a negative refracting power and is movable along an optical axis of said wide angle aspherical zoom lens so as to have a magnification changing function;

a third lens group which has a positive refracting power and is fixed relative to the image surface so as to have a light converging function; and a fourth lens group which has a positive refracting power and is movable along the optical axis such that the image surface is placeable in response to travel of said second lens group and movement of the object is fixed at a position spaced a predetermined distance from a reference surface;

wherein an air space is provided between said third and fourth lens groups;

wherein, when viewed sequentially from the object side toward the image surface side, said first lens group is constituted by a first concave lens, a first convexo-convex lens, a second concave lens, a second convexo-convex lens and a meniscus convex lens, said second lens group is constituted by a meniscus concave lens, a concavo-concave lens and a convex lens, said third lens group is constituted by a single lens having at least one aspherical surface, and said fourth lens group is constituted by a concave lens and a convex lens, at least one of which has at least one aspherical surface;

wherein in said first lens group, said first concave lens has a concave surface confronting the image surface, said second concave lens is a meniscus concave lens having a concave surface confronting the image surface, said meniscus convex lens has a concave surface confronting the image surface and an air space is provided between said first concave lens and said first convexo-convex lens;

wherein the following conditions (1) to (3) are satisfied:

$$1.0 < r2/f1 < 3.0 \quad (1)$$

$$1.5 < r3/f1 < 3.5 \quad (2)$$

$$0.2 < d2/f1 < 0.8 \quad (3)$$

where character f1 denotes a focal length of said first lens group, character r2 denotes a radius of curvature of one surface of said first concave lens of said first lens group, which surface confronts the image surface, character r3 denotes a radius of curvature of one surface of said first convexo-convex lens of said first lens group, which surface confronts the object, and character d2 denotes the air space between said first concave lens and said first convexo-convex lens in said first lens group.

* * * * *